United States Patent
Bouvrie et al.

(10) Patent No.: US 12,530,564 B1
(45) Date of Patent: Jan. 20, 2026

(54) COMBINED NEURAL NETWORK

(71) Applicant: Kayak Software Corporation, Stamford, CT (US)

(72) Inventors: Jacob Vincent Bouvrie, Arlington, MA (US); Tianbai Cui, Seabrook, NH (US)

(73) Assignee: Kayak Software Corporation, Stamford, CT (US)

( * ) Notice: Subject to any disclaimer, the term of this patent is extended or adjusted under 35 U.S.C. 154(b) by 1088 days.

(21) Appl. No.: 17/456,752

(22) Filed: Nov. 29, 2021

(51) Int. Cl.
 *G06N 3/045* (2023.01)
 *G06F 18/21* (2023.01)

(52) U.S. Cl.
 CPC ......... *G06N 3/045* (2023.01); *G06F 18/2193* (2023.01)

(58) Field of Classification Search
 CPC .................................................. G06N 3/045
 USPC .......................................................... 706/23
 See application file for complete search history.

(56) References Cited

U.S. PATENT DOCUMENTS

| | | | | |
|---|---|---|---|---|
| 10,690,806 | B2 * | 6/2020 | Dail | G01N 33/0098 |
| 10,802,488 | B1 * | 10/2020 | Abeloe | G06N 3/084 |
| 11,164,093 | B1 * | 11/2021 | Zappella | G06N 5/045 |
| 11,443,623 | B1 * | 9/2022 | Ratrout | G08G 1/0129 |
| 11,733,427 | B1 * | 8/2023 | Thielke | G06N 3/0442 |
| | | | | 702/3 |
| 11,889,112 | B2 * | 1/2024 | Ding | H04N 19/176 |
| 2003/0209893 | A1 * | 11/2003 | Breed | B60N 2/267 |
| | | | | 701/45 |
| 2004/0129478 | A1 * | 7/2004 | Breed | B60R 21/01534 |
| | | | | 180/273 |
| 2006/0208169 | A1 * | 9/2006 | Breed | G01S 15/88 |
| | | | | 250/221 |
| 2014/0195466 | A1 * | 7/2014 | Phillipps | G06F 16/00 |
| | | | | 706/12 |
| 2017/0299772 | A1 * | 10/2017 | Yuzhakov | G01W 1/10 |
| 2018/0101147 | A1 * | 4/2018 | Khabibrakhmanov | |
| | | | | G06F 16/2477 |
| 2019/0286970 | A1 * | 9/2019 | Karaletsos | G06N 3/045 |
| 2020/0175691 | A1 * | 6/2020 | Zhang | G06T 7/248 |
| 2020/0210809 | A1 * | 7/2020 | Kaizerman | G07F 17/3241 |
| 2020/0309993 | A1 * | 10/2020 | Ganshin | G06N 3/084 |
| 2020/0375549 | A1 * | 12/2020 | Wexler | A61B 5/14532 |

(Continued)

OTHER PUBLICATIONS

Cheng et al., "Wide & Deep Learning for Recommender Systems," DLRS., Sep. 15, 2016, pp. 7-10.
Cho et al., "On the Properties of Neural Machine Translation: Encoder-Decoder Approaches," Semantics and Structure in Statistical Translation, Oct. 25, 2014, 103-111.

(Continued)

*Primary Examiner* — Reza Nabi
(74) *Attorney, Agent, or Firm* — Lee & Hayes, P.C.

(57) ABSTRACT

Methods, systems, and apparatus, including computer programs encoded on computer storage media, for creating a combined neural network. One of the methods includes creating a combined neural network by combining a) a first neural network that includes a first plurality of weights and was trained to predict single output values that have a type with b) a second neural network that includes a second plurality of weights, the combined neural network created to predict a sequence of values, each value of which has the type; training the combined neural network by: determining a loss function for the combined neural network using a result of a comparison of training output data and expected output data; and updating one or more weights in the second plurality of weights for the second neural network using the loss function; and storing the combined neural network in memory.

20 Claims, 3 Drawing Sheets

(56) References Cited

U.S. PATENT DOCUMENTS

| | | | | |
|---|---|---|---|---|
| 2021/0146531 | A1* | 5/2021 | Tremblay | G06N 3/006 |
| 2021/0334644 | A1* | 10/2021 | Yu | G06N 3/045 |
| 2021/0342760 | A1* | 11/2021 | Patel | G06Q 10/06311 |
| 2021/0374502 | A1* | 12/2021 | Roth | G06N 3/08 |
| 2022/0041299 | A1* | 2/2022 | Wankewycz | B64D 37/30 |
| 2022/0076133 | A1* | 3/2022 | Yang | G06N 3/08 |
| 2022/0319018 | A1* | 10/2022 | Gervais | H04N 23/23 |
| 2022/0343221 | A1* | 10/2022 | Cook | G06N 20/20 |
| 2023/0011970 | A1* | 1/2023 | Serra Lleti | G16B 5/00 |
| 2023/0409572 | A1* | 12/2023 | Bouvrie | G06F 16/24539 |
| 2024/0062515 | A1* | 2/2024 | Oh | G06N 3/04 |
| 2024/0232729 | A1* | 7/2024 | Bouvrie | G06N 20/00 |
| 2025/0137689 | A1* | 5/2025 | Rigney | G06N 20/00 |

OTHER PUBLICATIONS

Gal et al., "A Theoretically Grounded Application of Dropout in Recurrent Neural Networks," Advances in Neural Information Processing Systems (NIPS 2016), Oct. 5, 2016, vol. 29, 14 pages.

He et al., "Deep Residual Learning for Image Recognition," Proceedings of the IEEE Conference on Computer Vision and Pattern Recognition, 2016, pp. 770-778.

Hochreiter et al., "Long Short-Term Memory," Neural Computation, 1997, 9(8):1735-1780.

Srivastava et al., "Dropout: A Simple Way to Prevent Neural Networks from Overfitting," Journal of Machine Learning Research, 2014, 15:1929-1958.

Wikipedia.com, "LightGBM," last updated May 14, 2021, Retrieved from URL <https://en.wikipedia.org/w/index.php?title=LightGBM&oldid=1023071208>, 3 pages.

\* cited by examiner

```
┌─────────────────────────────────────────────────────────────┐
│ Create a combined neural network by combining a) a first    │
│ neural network that includes a first plurality of weights   │
│ with b) a second neural network that includes a second      │
│ plurality of weights                                    202 │
└─────────────────────────────────────────────────────────────┘
                              │
                              ▼
┌─────────────────────────────────────────────────────────────┐
│ Determine a loss function for the combined neural network   │
│ using a result of a comparison of training output data and  │
│ expected output data                                    204 │
└─────────────────────────────────────────────────────────────┘
                              │
                              ▼
┌─────────────────────────────────────────────────────────────┐
│ Update one or more weights in the second plurality of       │
│ weights for the second neural network while maintaining,    │
│ unchanged, the weights in the first plurality of weights    │
│                                                         206 │
└─────────────────────────────────────────────────────────────┘
                              │
                              ▼
                   ╱─────────────────╲
                  ╱    Does an         ╲         No
                 ╱ accuracy of the      ╲───────────────┐
                 ╲ combined neural      ╱               │
                  ╲ network satisfy    ╱                │
                   ╲ an accuracy      ╱                 │
                    ╲ threshold?     ╱                  │
                     ╲    208       ╱                   │
                      ╲────────────╱                    │
                           │ Yes                         │
                           ▼                             │
┌─────────────────────────────────────────────────────────────┐
│ Provide the combined neural network to a prediction system  │
│                                                         210 │
└─────────────────────────────────────────────────────────────┘
                              │
                              ▼
┌─────────────────────────────────────────────────────────────┐
│ Receive, from a device, a prediction request            212 │
└─────────────────────────────────────────────────────────────┘
                              │
                              ▼
┌─────────────────────────────────────────────────────────────┐
│ Receive runtime output data from the combined neural        │
│ network that the combined neural network generated using    │
│ runtime input data                                      214 │
└─────────────────────────────────────────────────────────────┘
                              │
                              ▼
┌─────────────────────────────────────────────────────────────┐
│ Provide, to the device, the runtime output data to cause    │
│ the device to present the runtime output data           216 │
└─────────────────────────────────────────────────────────────┘
```

COMBINED NEURAL NETWORK

BACKGROUND

Neural networks generate output based on input data. For instance, a neural network can receive a vector as input and generate a single value or a vector of values as output.

SUMMARY

To train a neural network to more accurately predict a sequence of values, a training system can train a first neural network to predict individual values. The individual values can be values of the same type or a related type as the values that will be predicted in the sequence of values. For instance, when the sequence of values is the predicted weather for a week, the individual values can be predicted weather for a single day, such as an average weather, or a high or a low temperature.

The training system can then combine the first neural network with a second neural network to create a combined neural network. The training system can train the combined neural network to predict the sequence of values. While training the combined neural network, the training system might only change one or more weights for the second neural network and maintain at least some of the weights, e.g., all of the weights, for the first neural network unchanged.

A prediction system can use the combined neural network to predict the sequence of values, such as weather patterns, or electricity demand depending on the type of data used to train the combined neural network. The prediction system can take an appropriate action based on the predicted sequence. For instance, when the predicted sequence is a weather pattern, the prediction system can provide the predicted weather pattern sequence for presentation on a display. When the predicted sequence is electricity demand, the prediction system can cause a dynamic adjustment to a power generation environment given the predicted electricity demand pattern. This can include causing an increase or decrease in electricity generation given the predicted electricity demand pattern.

In general, one aspect of the subject matter described in this specification can be embodied in methods that include the actions of creating a combined neural network by combining a) a first neural network that includes a first plurality of weights and was trained to predict single output values that have a type with b) a second neural network that includes a second plurality of weights, the combined neural network created to predict a sequence of values, each value of which has the type; training the combined neural network by: determining a loss function for the combined neural network using a result of a comparison of training output data and expected output data, the training output data generated by the combined neural network using input data; and updating one or more weights in the second plurality of weights for the second neural network using the loss function; and storing the combined neural network in memory.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining the loss function can include computing one or more loss-based metrics; and defining the loss function using the one or more loss-based metrics.

In some implementations, training the combined neural network can include maintaining, unchanged, one or more of the weights in the first plurality of weights. Training the combined neural network can include updating one or more initial states for the second neural network while maintaining, unchanged, the weights in the first plurality of weights and the second plurality of weights. The method can include after training the combined neural network: receiving a runtime output data from the combined neural network that the combined neural network generated using runtime input data; and providing, to a device, the runtime output data to cause the device to present the runtime output data.

In some implementations, the method can include initializing the second neural network with random weights prior to creating the combined neural network. The second neural network might not be trained prior to creating the combined neural network.

In some implementations, creating the combined neural network can include creating the combined neural network by connecting an output of a layer from the first neural network with an input of a first layer in the second neural network. Connecting the output of the layer from the first neural network with the input of the first layer in the second neural network can include connecting the output of a second to last layer from the first neural network with the input of the first layer in the second neural network.

In some implementations, the first neural network can be trained to generate a single output value. Training the combined neural network can include training the combined neural network to generate a time-series output. The first neural network can be trained to predict a value for a time period. Training the combined neural network can include training the combined neural network to predict a sequence of values for the time period. The first neural network can be trained to predict a value for a time period. Training the combined neural network can include training the combined neural network to predict a sequence of values for a time window that includes the time period.

In some implementations, the first neural network can be a multilayer perceptron neural network model. The second neural network can be an autoregressive model.

In some implementations, determining the loss function for the combined neural network using the result of the comparison of the training output data and the expected output data can include providing input data to the combined neural network; in response to providing input data to the combined neural network, receiving the training output data; and determining a difference between the training output data and the expected output data that is associated with the input data. The method can include training the first neural network that includes the first plurality of weights until a first convergence criteria is satisfied. Training the combined neural network can include training the combined neural network until a second convergence criteria is satisfied.

The subject matter described in this specification can be implemented in various embodiments and may result in one or more of the following advantages. In some implementations, the systems and methods described in this specification can create a more accurate model that predicts a sequence of values by combining a first model trained to predict individual values of the same or a related type as the values in the sequence with a second model. The first and the second models can be neural networks used to create a combined neural network. In some implementations, the systems and methods described in this document can generate a smoother and/or more accurate sequence of values than other systems that do not have a combined neural network. A smoother sequence of values can improve the accuracy, or other evaluation metrics, of a prediction system, e.g., an accuracy of predicted energy generation, by reducing a likelihood of large spikes or dips in the predicted values caused when a single value does not align with other values in the sequence of values. In some implementations, a system or method that generates smoother sequences can have improved performance in settings where higher robustness, e.g., stability with respect to variation in inputs, is desired, where there can be disruption associated with highly variable or erratic sequences, or both. In some implementations, stage-wise training, e.g., training of a first neural network and then a combined neural network, can improve neural network training by increasing a likelihood that the combined neural network converges to a good solution compared to other systems, e.g., that do not use stage-wise training and might have higher validation loss, minimal network prediction changes after several iterations of backpropagation, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
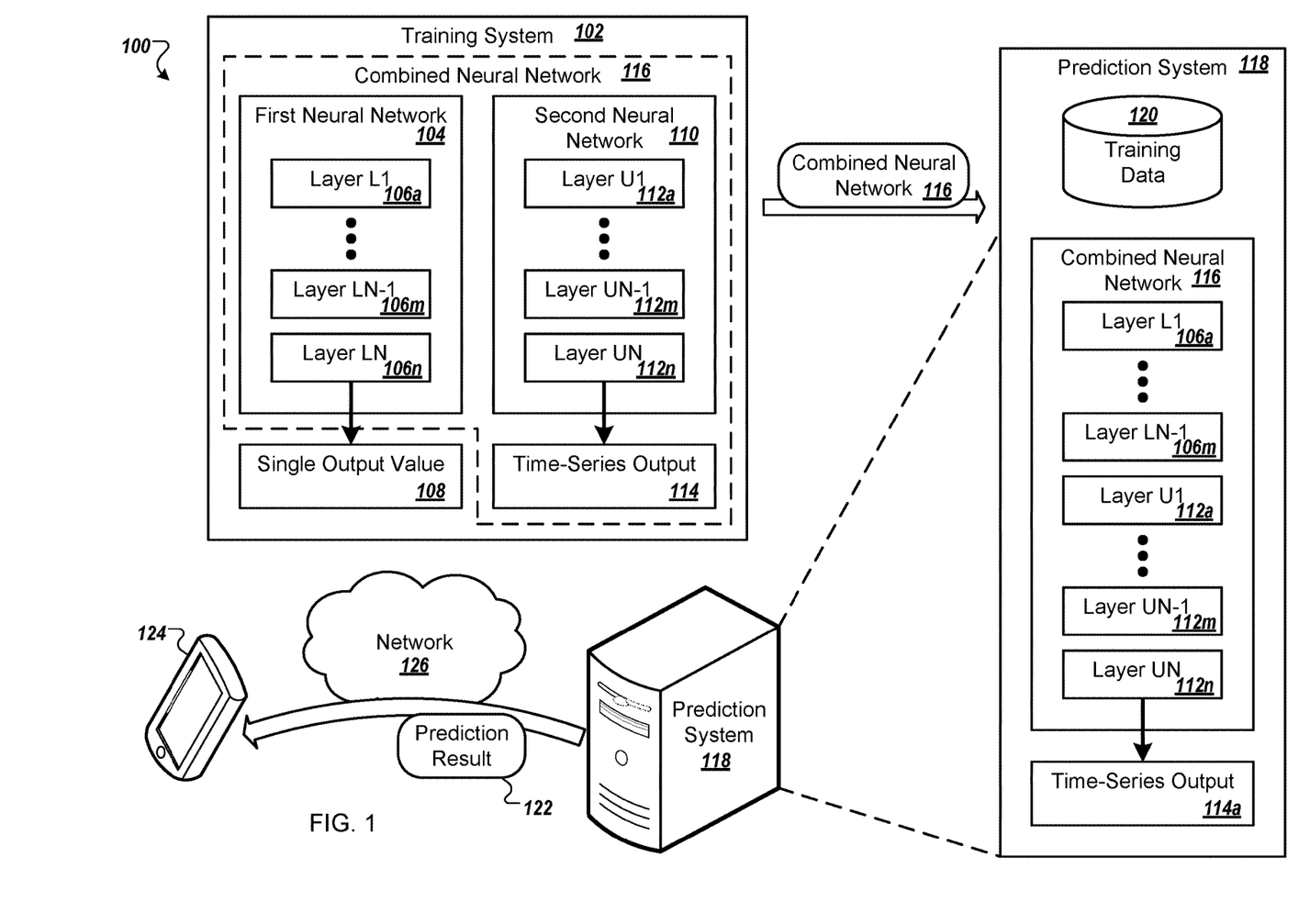
FIG. 1 depicts an example environment for training a combined neural network.

FIG. 1 depicts an example environment 100 for training a combined neural network 116. The environment 100 includes a training system 102 that creates the combined neural network 116 by combining a first neural network 104 and a second neural network 110. The first neural network 104 is trained to predict individual values. The training system 102 combines the second neural network 110 with the first neural network 104 to create the combined neural network 116 that can more accurately predict a sequence of values with the same or a related type as the individual values. The training system 102 then trains the combined neural network 116 by changing one or more second weights, e.g., all weights, in multiple second layers 112a-n for the second neural network 110 while maintaining one or more, e.g., all, first weights in multiple first layers 106a-n for the first neural network 104 constant.

The type of the values can be any appropriate value. For instance, when the first neural network 104 is trained to predict the weather for a time period, e.g., a day or an hour, the training system 102 can train the combined neural network 116 to predict the weather for a sequence of the time periods, e.g., output for a week, which output includes multiple values for days or hours during the week.

The combined neural network 116 can output a sequence of values that includes separate values for each time period within the sequence, e.g., with values for each day of the week, each hour of the week, or both. When the first neural network 104 is trained to predict energy demand for a time period, e.g., morning, afternoon, evening, or night, the training system 102 can train the combined neural network 116 to predict energy demand for a sequence of the time period, e.g., a week or a month. The output can include separate values for each time period within the sequence, e.g., with separate energy demand values for each morning within the month, each afternoon within the month, each evening within the month, and each night within the month.

The first neural network 104 can be any appropriate type of neural network. For instance, the first neural network 104 can be a multilayer perceptron ("MLP") based neural network model. The first neural network 104 can be a deep neural network. The first neural network 104 can have between ten to twenty layers. The layers in the first neural network 104 can be fully connected layers. In some examples, a system can create the first neural network 104 using a residual block to create skip connections between fully connected layers in the first neural network 104.

In some implementations, the first neural network 104 can be a wide neural network. For instance, some of the layers, e.g., the hidden layers, in the first neural network 104 can each have at least 1,000 nodes. By using a wide and a deep neural network for the first neural network 104, the first neural network 104 can have improved accuracy.

The first neural network 104 can have any appropriate number of layers 106a-n. For instance, the first neural network 104 can have a first layer L1 106a, a second layer LN-1 106m, and a third layer LN 106n. Each of the layers can have any appropriate number of first weights connecting the layer with a subsequent layer, e.g., as an embedding layer. Some of the layers can include the same number of weights. Some of the layers can include a different number of weights.

The first neural network 104 generates a single output value 108, e.g., a one-dimensional output value. For instance, when the first neural network 104 predicts the weather, the single output value 108 can be a predicted temperature, likelihood of rain, or another predicted weather value for a time-period during the day. The time-period can be an hour, e.g., from 9 am to 10 am, a time of day, e.g., morning or evening, or another appropriate time-period. Similarly, when the first neural network 104 predicts energy usage, the time-period can be an hour or a time of day for which the first neural network 104 predicts a single energy usage output value 108.

The first neural network 104 can be trained using any appropriate process, by any appropriate system, or both. For instance, the training system 102 can receive the first neural network 104 that is already trained. In some examples, the training system 102 can train the first neural network 104, e.g., using training data stored in a memory included in or otherwise accessible by the training system 102. The first neural network 104 can be trained until a first convergence criteria is satisfied. The first convergence criteria can represent an accuracy or another appropriate value.

In some examples, the first neural network 104 can be trained, e.g., by the training system 102 or another system, to predict average values for a future time window. The future time window can be any appropriate window, such as thirty days. For instance, the training system 102 can train the first neural network 104 to predict average values for each time-period in the future time window, e.g., the average weather in the next thirty days or another thirty day time window.

The first neural network 104 can be trained to accept any appropriate type of input. For instance, the first neural network 104 can be trained, e.g., by the training system 102 or another system, to accept a sequence of values as input. The sequence of values can have a fixed length or a variable length. The first neural network 104 can accept a variable length of input when an amount of relevant data for a single predicted value might change, e.g., based on a type for the predicted value, an amount of available cached, live, or both, data, or a combination of these. The sequence of values can include one or more cached values, e.g., from training data 120, live values, or a combination of both.

After the first neural network 104 is trained, whether by the training system 102 or another system, the training system 102 can create the combined neural network 116. For instance, the training system 102 can remove a last layer LN 106n from the first neural network 104. This last layer LN 106n can be a layer that generates the single output value 108. The training system 102 can connect the second to last layer LN-1 106m from the first neural network 104 to the first layer U1 112a of the second neural network 110 to create the combined neural network 116. This connection process can enable the combined neural network 116 to provide output data from the second to last layer LN-1 of the first neural network 104 as input to the first layer U1 112a of the second neural network 110.

The combined neural network 116 can accept, as input, the same types of values as the first neural network 104 because an input layer for the first neural network 104 is also the input layer for the combined neural network 116. For instance, the combined neural network 116 can accept a sequence of values as input. The sequence of values can have a fixed length or a variable length. The sequence of values can include cached data, live data, or both.

The second neural network 110 can have any appropriate model to process variable length sequences. For instance, when the first neural network 104 is an encoder, the second neural network 110 can be part or all of a decoder, e.g., that can process variable length sequences in an autoregressive fashion. When the first neural network 104 is an encoder and the second neural network 110 is part or all of a decoder, the combined neural network 116 can be an encoder-decoder network.

The second neural network 110 can feed its previous outputs back in to use as input when making the next prediction in a sequence of predictions, e.g., using recurrent units. Some examples of this type of autoregressive model can include transformer-based encoder/decoder blocks, a convolution based decoder, a long short-term memory, or a gated recurrent unit.

The second neural network 110 can have multiple second layers 112a-n that form part of a recurrent unit, e.g., a long short-term memory ("LSTM"). In some examples, the second neural network 110 can have three layers of LSTM cells. Each layer can have a hidden dimension of 256. The second neural network 110 can have a rectified linear unit ("ReLU") activation function. The last layer UN 112n in the second neural network 110 can be a softmax layer, e.g., the output from which is used to calculate changes to the weights in the second neural network 110.

In some implementations, the second neural network can include one or more layers of gated recurrent units ("GRUs"). The GRU layers can have one or more properties similar to the properties of the LSTM discussed above.

The last layer UN 112n of the second neural network 110 can generate a time-series output 114, e.g., a multi-dimensional output. Each value of the time-series output 114 can be a value in the sequence of values generated by the combined neural network 116. For example, when the combined neural network 116 generates a sequence of weather values for a thirty day period, the time-series output 114 can be a one-dimensional array with thirty values, each of which represent the average weather for a day in the next thirty days or another thirty day time window.

In some implementations, the training system 102 can connect the first neural network 104 with the second neural network 110 in two different ways. The first connection can be for the initial states of recurrent units in the second neural network 110. The second connection can be for use of output data from the first neural network 104 as input to the second neural network 110, as described above.

For instance, the training system 102 can use output from the first neural network 104, e.g., the second to last layer LN-1 106m, to calculate one or more initial states for the layers in the second neural network 110. The training system 102 can perform this process when the second neural network 110 is an autoregressive model and its layers U1 through UN 112a-n include one or more recurrent units.

For the training process, the training system 102 can maintain one or more of the weights of the first neural network 104, e.g., the embedding layers in the combined neural network 116, constant while updating, e.g., fine-tuning, the other parts of the combined neural network 116. These embedding layers can map input categorical features to learnable feature vectors as part of the combined neural network 116. For instance, the training system 102 can maintain all or a subset of the weights of the first neural network 104 constant while updating other parts of the combined neural network 116. The subset of weights can include all weights in one or more layers of the first neural network 104. The updating can include the training system 102 updating one or more weights for the second neural network 110 that is an autoregressive model.

In some implementations, the training system 102 can update one or more of the weights in the first neural network 104 during the training process. For instance, the training system 102 can determine whether maintaining the weights of the first neural network 104 the same or changing at least some of the weights of the first neural network 104 increases an accuracy of the combined neural network 116. In response to the determination, the training system 102 can either maintain all of the weights, some of the weights, or none of the weights of the first neural network 104 the same. The latter can include the training system 102 adjusting all of the weights of the first neural network 104 during a training iteration.

In some implementations, the training system 102 can maintain different numbers of weights in the first neural network 104 the same at different times, e.g., during different training iterations for the same training process or during different training processes that occur at different times. For example, the training system 102 can perform a training process according to a schedule, e.g., daily, weekly, or monthly. The training system 102 can determine to maintain some of the weights in the first neural network 104 the same during training processes for a first schedule, e.g., during a daily training process, while changing some or all of the weights in the first neural network during other training processes for a second, different schedule, e.g., during a weekly training process.

After creating the combined neural network 116, the training system 102 trains one or more weights in the combined neural network 116. During training of the combined neural network 116, the training system 102 adjusts one or more weights in the layers U1 through UN 112a-n of the second neural network 110 while maintaining one or more, e.g., all, the weights in the layers L1 through LN-1 of the first neural network 104 unchanged. For the training process, the training system 102 trains the combined neural network 116 to predict a sequence of values of the same or a related type predicted by the first neural network 104.

For instance, when the first neural network 104 is trained to predict the weather for an individual day, the training system 102 can train the combined neural network 116 to predict a sequence of weather predictions, e.g., predicting the weather for multiple days many days out into the future. This can enable the training system 102 to train the combined neural network 116 when the training system 102 does not have, or it would be difficult to create, a whole trajectory of future target predictions for training the first neural network 104. For instance, this can enable the training system 102 to train the combined neural network 116 when the training system does not have consistent daily observations for training the first neural network 104 to generate a sequence of values, e.g., irrespective of the particular type of data used for training. In some examples, training the combined neural network 116 to predict a sequence of values when the first neural network is trained to predict a single output value can enable the training system 102 to train the combined neural network 116 with more data, e.g., partially related data, than the training system 102 would otherwise be able to use when training the combined neural network 116.

The training system 102 trains the combined neural network 116 until a second convergence criteria is satisfied. The second convergence criteria can be the same criteria or a different criteria from the first convergence criteria.

In some implementations, the training system 102 can train the combined neural network 116 after the initial training, e.g., can retrain the combined neural network 116. Although this specification generally refers to training the combined neural network 116, this training process applies to the initial training and any subsequent retraining.

The training system 102 can train, e.g., retrain, the combined neural network 116 according to a schedule. For instance, the training system 102 can train the combined neural network 116 every week.

In some implementations, the training system 102 can train, e.g., retrain, different portions of the combined neural network 116 according to different frequencies. For instance, the training system 102 can train parameters for the second neural network 110 more frequently than parameters for the first neural network 104. In some examples, the training system 102 can train, e.g., retrain, only the last layer of the first neural network 104 that is included in the combined neural network 116, e.g., that was not the output layer of the first neural network 104, and then apply some light fine-tuning to one or more parameters in the second neural network 110.

In some implementations, the training system 102 can use dropout layers in the combined neural network 116, e.g., such that only a random fraction of weights in the combined neural network 116 are used during each forward pass.

In some implementations, e.g., when the training system 102 uses dropout layers during training, the combined neural network 116 can use dropout layers during inference. The combined neural network 116 can determine whether to use dropout layers during inference. For instance, the combined neural network 116 can determine whether an input value indicates that the combined neural network 116 should generate a distribution of output predictions, e.g., at each time point in a time series. If so, the combined neural network 116 can determine to use dropout layers during inference, e.g., the combined neural network 116 can turn on dropout, e.g., in the decoder layers. When the combined neural network 116 determines that it should not generate a distribution of output predictions, the combined neural network 116 can determine to skip using dropout layers, e.g., to not drop any weights.

The combined neural network 116 can predict a sequence of values that has the same size or a different size from the time window for which the first neural network 104 was trained to predict individual values. For instance, when the first neural network 104 is trained to predicted individual values within a thirty day time window, the training system 102 can train the combined neural network 116 to predict a sequence of values that includes one value for each time-period in a thirty day time window, e.g., one value for each day in the thirty day time window.

In some examples, the training system 102 can train the combined neural network 116 to predict a sequence of values for a different time window duration than the time window over which the first neural network 104 was trained. A size of the time window for the first neural network 104 can be smaller than, equal to, or smaller than or equal to a size of the time window for the combined network 116. For instance, the training system 102 can train the combined neural network 116 to predict values for a thirty-day time window when the first neural network 104 was trained to predict individual values for each time-period in a thirty-day time window. In some implementations, the training system 102 can train the combined neural network 116 to predict values for a thirty-day time window when the first neural network 104 was trained to predict individual values for each time-period in a twenty-four hour time window After training the combined neural network 116, the training system 102 can provide the combined neural network 116 to a prediction system 118. For example, the training system 102 can provide the prediction system 118 with the combined neural network 116 using a network. In some examples, the training system 102 and the prediction system 118 can be part of the same system, e.g., different components in a single system.

The prediction system 118 uses the combined neural network 116 to predict time-series outputs 114a, e.g., multi-dimensional outputs. For instance, the prediction system 118 can retrieve training data 120 from a database. The training data 120 can be historical data, live data, or both. Live data can be data that was retrieved within a threshold period of time while historical data was retrieved more than the threshold period of time ago. For instance, live data can be "just retrieved moments ago" data that has been queried from another source, e.g., a provider, live. In some examples, the threshold period of time is 30 minutes. The prediction system 118 can provide the retrieved training data to the combined neural network 116 as input to cause the combined neural network 116 to predict the time-series output 114a.

The training data 120 is the same type of data as that used to train the first neural network 104 and the combined neural network 116. For example, when the combined neural network 116 is trained to predict a sequence of weather values, the training data 120 is historical weather data.

The training data 120 can include values used to train the first neural network 104, the combined neural network 116, or both. For instance, the training system 102 can use a first set of data from the training data 120 over a first time window as input to the combined neural network 116 to predict a sequence of values for a second time window. The training system 102 can use a second, different set of data from the training data 120 over the second time window to update the combined neural network 116 during training, e.g., backward propagation. For instance, the second time window is after the first time window and the training system 102 uses an accuracy of the time-series output 114 from the combined neural network 116 compared to the second, different set of data to update one or more weights from the second neural network 110, e.g., during backward propagation.

The prediction system 118 can provide a prediction result 112 to a client device 124. For instance, the prediction system 118 can receive a request from the client device 124 for a predicted value. The request can identify a future time window for predicted values. The prediction system 118 can use the future time window, and other data for the request, to determine data from the training data 120 to use as input to the combined neural network 116. For example, the request can identify a geographic location for which the prediction system 118 will predict the weather or an estimated energy usage.

The prediction system 118 uses the determined data from the training data 120 as input to the combined neural network 116. The prediction system 118 receives, from the combined neural network 116, the time-series output 114a that includes a sequence of values responsive to the request received from the client device 124. The prediction system 118 provides, as the prediction result 122, the time-series output 114a to the client device 124.

In some examples, the prediction result 122 includes a vector of values each of which represent a single predicted value. For instance, each value in the vector can be an average weather for a time-period in the future time window identified by the request received from the client device 124.

In some implementations, the prediction system 118 can provide the client device 124 with instructions for presentation of a user interface that depicts the prediction result 122. The instructions can be HTML instructions, instructions for an application installed on the client device 124, or other appropriate instructions.

In some implementations, a system can perform an automated action based on a time-series output 114a generated by the combined neural network 116. For instance, when the time-series output 114a indicates predicted energy usage for a future time window, the prediction system 118 or another system can change an amount of energy generated based on the predicted energy usage. When the predicted energy usage is higher than an energy system would otherwise output, a system can cause the energy system to generate more energy, e.g., by turning on or increasing the output from one or more energy generating components. When the predicted energy usage is lower than an energy system would otherwise output, a system can cause the energy system to generate less energy, e.g., by turning off or reducing the output generated by one or more energy generating components.

The training system 102 and the prediction system 118 are example systems implemented as computer programs on one or more computers in one or more locations, in which the systems, components, and techniques described in this document are implemented. The client device 124 can include a personal computer, a mobile communication device, or another device that can send and receive data over a network 126. The network, such as a local area network (LAN), wide area network (WAN), the Internet, or a combination thereof, connects the client device 124, the prediction system 118, and, optionally, the training system 102. The training system 102, the prediction system 118, or both, can use a single server computer or multiple server computers operating in conjunction with one another, including, for example, a set of remote computers deployed as a cloud computing service.

Figure 2:
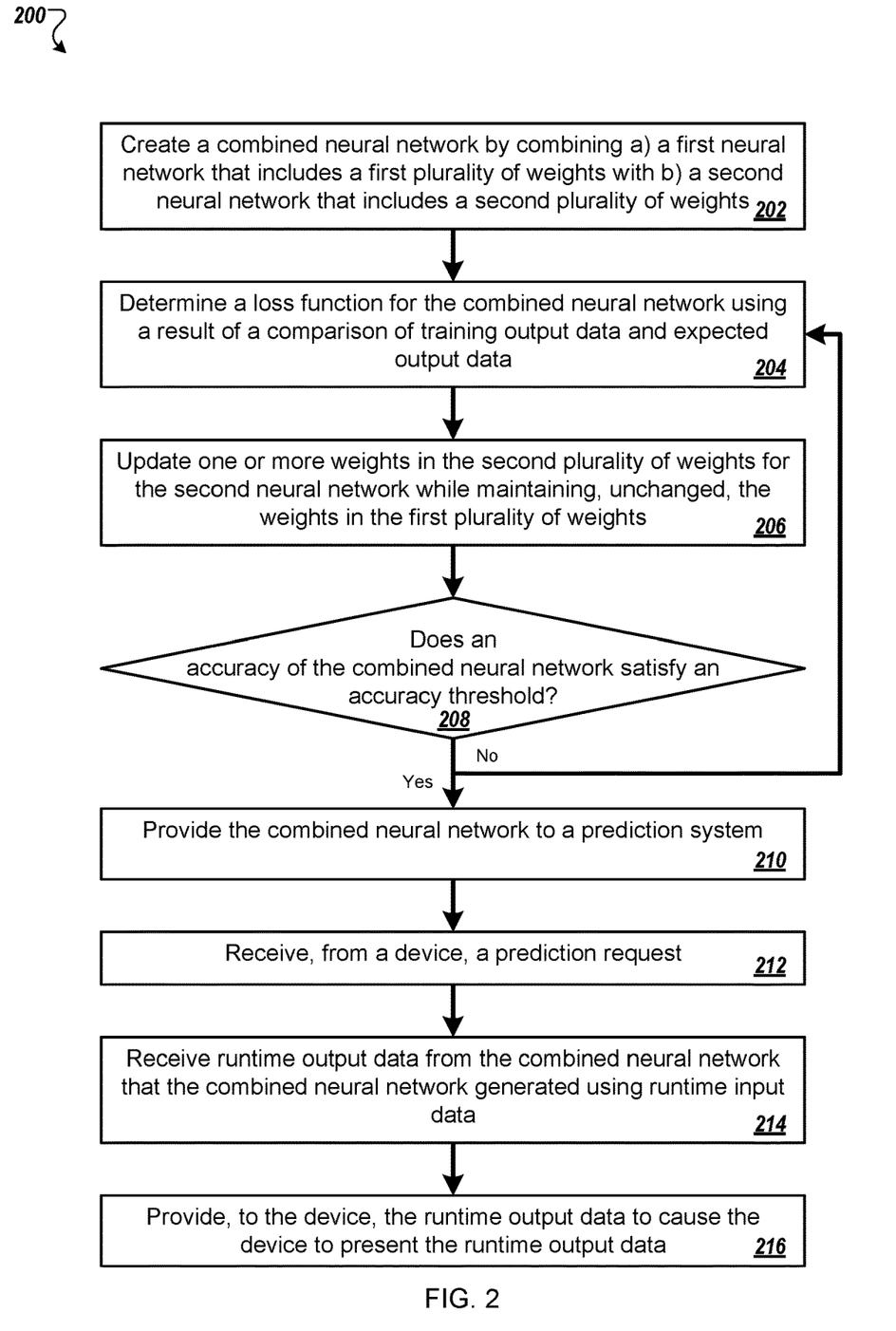
FIG. 2 is a flow diagram of a process for creating, training, or both, a combined neural network.

FIG. 2 is a flow diagram of a process 200 for creating, training, or both, a combined neural network. For example, the process 200 can be used by the training system 102, the prediction system 118, or a combination of both, from the environment 100.

A training system creates a combined neural network by combining a) a first neural network that includes a first plurality of weights with b) a second neural network that includes a second plurality of weights (202). The training system can combine the first neural network and the second neural network in any appropriate manner. For instance, the training system can use output from the first neural network to calculate initial states for one or more cells in the second neural network, e.g., recurrent units. The training system can remove an output layer from the first neural network and combine the output from the earlier layer to an input layer for the second neural network. The training system can use data generated by the output layer to calculate the initial states for the cells in the second neural network.

In some examples, predictions from the first neural network can provide hints for the second neural network. In some examples, the training, e.g., optimization, fitting, or both, task for the second network can reference the output of the first neural network, for example if the second network computed values residual to, e.g., as a correction of, the first neural network's reference predicted value.

The training system determines a loss function for the combined neural network using a comparison of training output data and expected output data (204). The combined neural network generates the training output data using input data. A result of the comparison of the training output data and the expected output data can be a loss-based evaluation function, a quotient, a difference, a mean-squared-error, or any other appropriate value.

For example, the training system can provide input data to the combined neural network to cause the combined neural network to generate output data. The input data can be any appropriate type of input, such as a sequence, a fixed length input, a variable length input, or a combination of these. The input data can be cached data, e.g., from the training data, live data, e.g., that was not yet cached, or a combination of both.

In response to providing the input data, the training system receives the output data from the combined neural network. The training system can compare the output data with expected output data to determine the result of the comparison of the output data and the expected output data. The expected output data can be stored in a database, e.g., a database of training data. The training system can use the result to determine the loss function for the combined neural network. The loss function can represent an accuracy or an error function of the combined neural network.

The training system can determine the loss function by computing one or more loss-based metrics. The loss-based metrics can include a loss quantity among other appropriate loss-based metrics. The training system can then define the loss function using the one or more loss-based metrics.

The training system updates one or more weights in the second plurality of weights for the second neural network while maintaining, unchanged, the weights in the first plurality of weights (206). For example, the training system can use the loss function to update one or more weights for the second neural network.

The training system determines whether an accuracy of the combined neural network satisfies an accuracy threshold (208). For instance, the training system can determine whether a result of the comparison of the training output data and the expected output data satisfies the accuracy threshold. The result can satisfy the accuracy threshold when the result is less than, equal to, or either, the accuracy threshold. In some examples, the result can satisfy the accuracy threshold when the result is greater than, equal to, or either, the accuracy threshold, e.g., when the result represents a percentage. In some implementations, the training system can use any other appropriate threshold criteria in addition to or instead of the accuracy threshold.

In response to the training system determining that the accuracy does not satisfy the accuracy threshold, the training system can perform another training iteration. For instance, the training system can provide another set of training data to the combined neural network and determine another loss function for the combined neural network, e.g., proceed to step 204.

The training system provides the combined neural network to a prediction system (210). The training system can provide the combined neural network in response to determining that the accuracy satisfies the accuracy threshold. The training system can provide the combined neural network using a computer network or another connection with the prediction system.

The prediction system receives, from a device, a prediction request (212). For instance, the prediction system receives the prediction request that identifies a future time window for a prediction and one or more other parameters. The parameters can indicate one or more geographic locations to which the prediction applies, e.g., for the weather or an energy usage prediction.

The prediction system can use the prediction request to determine training data to use as input for the combined neural network. For instance, the prediction system can use the parameters to determine a subset of the training data that corresponds to the request. The subset of the training data can be for the same one or more geographic locations.

The prediction system provides the determined training data, data for the future time window, or both, as input to the combined neural network. For instance, the prediction system provides a matrix as input to the combined neural network. The matrix can include one or more values from the subset of the training data, one or more values for the future time window, or both. The one or more values for the future time window can represent a date range, a start date for the future time window, a duration for the future time window, or a combination of two or more of these.

The prediction system receives runtime output data from the combined neural network that the combined neural network generated using runtime input data (214). For example, the provision of the input values to the combined neural network by the prediction system can cause the combined neural network to generate the runtime output data. The runtime output data can be a time-series output, e.g., a vector, matrix, or higher-order tensor.

The prediction system provides, to the device, the runtime output data to cause the device to present the runtime output data (216). For instance, the prediction system provides the runtime output data along with instructions that cause the device to present the runtime output data, or a portion of the runtime output data. The device can present the runtime output data on a display, audibly, e.g., using speakers, or in another appropriate manner.

The order of steps in the process 200 described above is illustrative only, and creating, training, or both, the combined neural network can be performed in different orders. For example, the prediction system can cache runtime output data generated by the combined neural network. In these examples, the prediction system can receive the runtime output data from the combined neural network, e.g., perform step 214, and then receive the prediction request from the device, e.g., perform step 212.

In some implementations, the process 200 can include additional steps, fewer steps, or some of the steps can be divided into multiple steps. For example, the training system can randomly initialize one or more, e.g., all, weights for the second neural network. For instance, prior to creating the combined neural network and training the combined neural network, the second neural network is not trained. The training system can initialize weights for the second neural network and then train the second neural network as part of the combined neural network.

In some implementations, the process 200 can include steps 202 through 206 without the other steps in the process 200. In some implementations, the process 200 can include steps 204 through 208 without the other steps in the process 200. In some implementations, the process can include steps 204 and 206 without the other steps in the process 200.

In some implementations, the prediction system can determine a confidence interval around a sequence of values. The confidence interval can represent a likelihood that a value in the sequence is accurate. For instance, to determine a confidence interval, the prediction system can use a random sub-sample of parameters based on the input parameters. The prediction system can use the random sub-sample of parameters to determine different sets of input data for the combined neural network. The prediction system can receive, from the combined neural network and for each of the sets of input data, output data. Each set of output data can represent a different prediction. The prediction system can use the sets of output data to create a distribution which represents the confidence interval for a sequence of values. The prediction system can use a combination of the sets of output data, e.g., an average, to determine the sequence of values.

In some implementations, the prediction system can use a confidence interval to determine whether additional predictions should be performed. For instance, when the confidence interval satisfies a confidence interval threshold, the prediction system can determine to use a corresponding sequence of values, e.g., to provide the sequence to a client device. When the confidence interval does not satisfy the confidence interval threshold, the prediction system can determine to calculate additional sets of output data, and calculate an updated confidence interval using the additional sets of output data and the original sets of output data.

In some implementations, the combined neural network can be used to predict future daily flight prices for a given time window. The training data used to train the combined neural network, as input for the trained combined neural network, or both, can include several months of flight search data. The first neural network can be trained to predict an average flight price for a time-period, e.g., a day or a sequence of days. The combined neural network can be trained to predict a sequence of average flight prices for a time window, e.g., one predicted price for each day during the time window that includes multiple days.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 3:
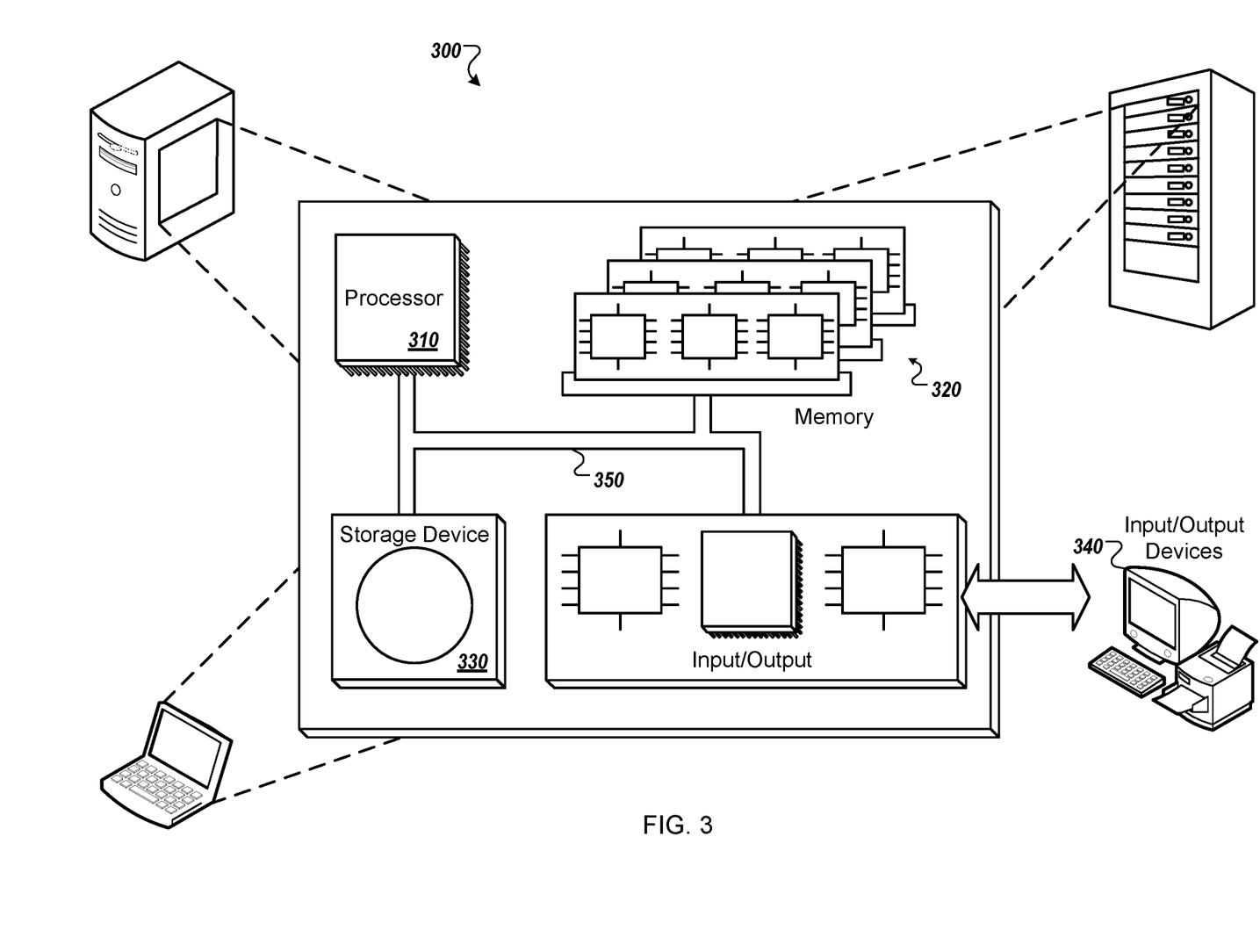
FIG. 3 is a block diagram of a computing system that can be used in connection with computer-implemented methods described in this document.

An example of one such type of computer is shown in FIG. 3, which shows a schematic diagram of a computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous. Model training, live model inference, or both, can be performed using accelerated computing hardware, such as a graphics processing unit, a tensor processing unit, multi-core/massive-core computing platforms, or a combination of two or more of these.

What is claimed is:

1. A system comprising one or more computers and one or more storage devices on which are stored instructions that are operable, when executed by the one or more computers, to cause the one or more computers to perform operations comprising:

creating a combined neural network by combining a) a first neural network that includes a first plurality of weights and was trained to predict single output values that have a type with b) a second neural network that includes a second plurality of weights, wherein combining the first neural network and the second neural network comprises removing an output layer from the first neural network and combining an output from an earlier layer to an input layer for the second neural network, the combined neural network created to predict a sequence of values, each value of which has the type;

training the combined neural network by:

determining a loss function for the combined neural network using a result of a comparison of training output data and expected output data, the training output data generated by the combined neural network using input data; and updating one or more weights in the second plurality of weights for the second neural network using the loss function; and storing the combined neural network in memory.

2. The system of claim 1, wherein determining the loss function comprises:

computing one or more loss-based metrics; and defining the loss function using the one or more loss-based metrics.

3. The system of claim 1, wherein training the combined neural network comprises maintaining, unchanged, one or more of the weights in the first plurality of weights.

4. The system of claim 3, wherein training the combined neural network comprises:
updating one or more initial states for the second neural network while maintaining, unchanged, the weights in the first plurality of weights and the second plurality of weights.

5. The system of claim 1, the operations comprising:
after training the combined neural network:
receiving a runtime output data from the combined neural network that the combined neural network generated using runtime input data; and
providing, to a device, the runtime output data to cause the device to present the runtime output data.

6. The system of claim 1, the operations comprising initializing the second neural network with random weights prior to creating the combined neural network.

7. The system of claim 6, wherein the second neural network is not trained prior to creating the combined neural network.

8. The system of claim 1, wherein creating the combined neural network comprises creating the combined neural network by connecting an output of a layer from the first neural network with an input of a first layer in the second neural network.

9. The system of claim 8, wherein connecting the output of the layer from the first neural network with the input of the first layer in the second neural network comprises connecting the output of a second to last layer from the first neural network with the input of the first layer in the second neural network.

10. The system of claim 1, wherein:
the first neural network was trained to generate a single output value; and
training the combined neural network comprises training the combined neural network to generate a time-series output.

11. The system of claim 1, wherein:
the first neural network was trained to predict a value for a time period; and
training the combined neural network comprises training the combined neural network to predict a sequence of values for the time period.

12. The system of claim 1, wherein:
the first neural network was trained to predict a value for a time period; and
training the combined neural network comprises training the combined neural network to predict a sequence of values for a time window that includes the time period.

13. The system of claim 1, wherein the first neural network comprises a multilayer perceptron neural network model.

14. The system of claim 1, wherein the second neural network comprises an autoregressive model.

15. The system of claim 1, wherein determining the loss function for the combined neural network using the result of the comparison of the training output data and the expected output data comprises:
providing input data to the combined neural network;
in response to providing input data to the combined neural network, receiving the training output data; and
determining a difference between the training output data and the expected output data that is associated with the input data.

16. The system of claim 1, the operations comprising:
training the first neural network that includes the first plurality of weights until a first convergence criteria is satisfied, wherein:
training the combined neural network comprises training the combined neural network until a second convergence criteria is satisfied.

17. A non-transitory computer storage medium encoded with instructions that, when executed by one or more computers, cause the one or more computers to perform operations comprising:
creating a combined neural network by combining a) a first neural network that includes a first plurality of weights and was trained to predict single output values that have a type with b) a second neural network that includes a second plurality of weights, wherein combining the first neural network and the second neural network comprises removing an output layer from the first neural network and combining an output from an earlier layer to an input layer for the second neural network, the combined neural network created to predict a sequence of values, each value of which has the type;
training the combined neural network by:
determining a loss function for the combined neural network using a result of a comparison of training output data and expected output data, the training output data generated by the combined neural network using input data; and
updating one or more weights in the second plurality of weights for the second neural network using the loss function;
and
storing the combined neural network in memory.

18. The non-transitory computer storage medium of claim 17, wherein:
the first neural network was trained to generate a single output value; and
training the combined neural network comprises training the combined neural network to generate a time-series output.

19. The non-transitory computer storage medium of claim 17, wherein:
the first neural network was trained to predict a value for a time period; and
training the combined neural network comprises training the combined neural network to predict a sequence of values for the time period.

20. A computer-implemented method comprising:
creating a combined neural network by combining a) a first neural network that includes a first plurality of weights and was trained to predict single output values that have a type with b) a second neural network that includes a second plurality of weights, wherein combining the first neural network and the second neural network comprises removing an output layer from the first neural network and combining an output from an earlier layer to an input layer for the second neural network, the combined neural network created to predict a sequence of values, each value of which has the type;
training the combined neural network by:
determining a loss function for the combined neural network using a result of a comparison of training output data and expected output data, the training output data generated by the combined neural network using input data; and updating one or more weights in the second plurality of weights for the second neural network using the loss function; and storing the combined neural network in memory.

* * * * *